United States Patent
Lo et al.

(10) Patent No.: US 11,331,811 B1
(45) Date of Patent: May 17, 2022

(54) ROBOTIC PALM AND FINGER DEVICE THEREOF

(71) Applicant: INDUSTRIAL TECHNOLOGY RESEARCH INSTITUTE, Hsinchu (TW)

(72) Inventors: Shu-Yen Lo, Zhubei (TW); Kai-Jen Pai, New Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/150,118

(22) Filed: Jan. 15, 2021

(30) Foreign Application Priority Data

Nov. 11, 2020 (TW) ................................. 109139308

(51) Int. Cl.
*B66C 1/10* (2006.01)
*B25J 15/00* (2006.01)
(Continued)

(52) U.S. Cl.
CPC ....... *B25J 15/0009* (2013.01); *B25J 15/0213* (2013.01); *B25J 17/0275* (2013.01)

(58) Field of Classification Search
CPC ............... B25J 15/0009; B25J 15/0213; B25J 17/0275; B25J 9/1045; B25J 9/1075; B25J 9/123
(Continued)

(56) References Cited

U.S. PATENT DOCUMENTS 4,114,464 A * 9/1978 Schubert .............. B25J 15/0213
74/89.14
4,623,183 A * 11/1986 Aomori .................. B25J 15/103
294/106
(Continued)

FOREIGN PATENT DOCUMENTS

CN 102729255 A 10/2012
CN 104936749 A 9/2015
(Continued)

OTHER PUBLICATIONS

Belter et al., "Mechanical design and performance specifications of anthropomorphic prosthetic hands: A review", JRRD, 2013, vol. 50, No. 5, pp. 599-618.
(Continued)

*Primary Examiner* — Paul T Chin
(74) *Attorney, Agent, or Firm* — Birch, Stewart, Kolasch & Birch, LLP

(57) ABSTRACT

A finger device including a finger segment, a finger base, a first steering control mechanism, a first actuator, a second steering control mechanism, a universal joint and a second actuator is provided. The finger base is connected to one end of the finger segment, and the first steering control mechanism is disposed on the finger base. The first actuator is configured to provide a first moment to the first steering control mechanism, so that the finger segment and the finger base have a degree of freedom in a first moving direction. The second steering control mechanism is disposed on the finger base. The second actuator is configured to provide a
(Continued)

second moment to the universal joint. The universal joint is rotatably connected between the second actuator and the second steering control mechanism, so that the finger segment has a degree of freedom in a second moving direction.

11 Claims, 8 Drawing Sheets

(51) Int. Cl.
*B25J 15/02* (2006.01)
*B25J 17/02* (2006.01)

(58) Field of Classification Search
USPC .......................................... 294/106, 213, 111
See application file for complete search history.

(56) References Cited

U.S. PATENT DOCUMENTS

| | | | |
|---|---|---|---|
| 4,821,594 A * | 4/1989 | Rosheim | B25J 9/104 |
| | | | 294/106 |
| 4,955,918 A | 9/1990 | Lee | |
| 5,108,140 A * | 4/1992 | Bartholet | B25J 15/0009 |
| | | | 294/106 |
| 8,052,185 B2 | 11/2011 | Madhani | |
| 8,894,117 B1 * | 11/2014 | Cheon | B25J 9/102 |
| | | | 294/106 |
| 9,840,009 B2 | 12/2017 | Laville et al. | |
| 10,442,089 B2 | 10/2019 | Laville et al. | |
| 2014/0159408 A1 * | 6/2014 | Neff | B25J 15/0009 |
| | | | 294/213 |
| 2014/0197652 A1 * | 7/2014 | Wang | B25J 15/0616 |
| | | | 294/185 |
| 2016/0303745 A1 * | 10/2016 | Rockrohr | A61B 34/71 |
| 2019/0070655 A1 | 3/2019 | Kim | |

FOREIGN PATENT DOCUMENTS

| | | |
|---|---|---|
| CN | 107756424 A | 3/2018 |
| CN | 108274487 A | 7/2018 |
| CN | 211030041 U | 7/2020 |
| DE | 10 2012 003 360 A1 | 8/2013 |
| EP | 2 719 361 B1 | 4/2019 |
| TW | 201806717 A | 3/2018 |

OTHER PUBLICATIONS

Kontoudis et al., "An Adaptive, Humanlike Robot Hand with Selective Interdigitation: Towards Robust Grasping and Dexterous, In-Hand Manipulation", 2019 IEEE-RAS 19th International Conference on Humanoid Robots (Humanoids), Toronto, Canada, Oct. 15-17, 2019, pp. 251-258.
Lee et al., "Development of Bio-mimetic Robot Hand Using Parallel Mechanisms", Proceedings of the 2009 IEEE International Conference on Robotics and Biomimetics, Dec. 19-23, 2009, Guilin, China, pp. 550-555.
Mottard et al., "Underactuated tendon driven robotic/prosthetic hands: design issues", Robotics: Science and Systems, 2017, total 9 pages.
Park et al., "Development of Anthropomorphic Robot Finger for Violin Fingering", ETRI Journal, 2016, vol. 38, No. 6, pp. 1218-1228.
Saikia et al., "Recent advancements in prosthetic hand technology", Journal of Medical Engineering & Technology, 2016, pp. 1-10, total 11 pages.

* cited by examiner

ROBOTIC PALM AND FINGER DEVICE THEREOF

This application claims the benefit of Taiwan application Serial No. 109139308, filed Nov. 11, 2020, the disclosure of which is incorporated by reference herein in its entirety.

TECHNICAL FIELD

The disclosure relates in general to a robotic arm, and more particularly to a robotic palm and a finger device thereof.

BACKGROUND

Along with the advance in technology, the development and application of robots has gained remarkable improvements. Of the automated production equipment, robotic arm is an indispensable element. Particularly, the flexibility and size minimization is the focus of research and development of the robotic arm. Due to an insufficient degree of freedom, the conventional robotic arm can only do simple grasping and cannot be adapted to conformal grasping of various objects. Due to the limited mechanical space, the conventional robotic arm cannot directly drive the transmission element using a micro motor, and therefore can only achieve a limited effect of grasping. Furthermore, the conventional robotic arm cannot imitate human's finger actions, such as finger curling or finger pitch adjustment, and needs to be further improved.

SUMMARY

The disclosure is directed to a finger device capable of imitating human's finger actions.

According to one embodiment, a finger device including a finger segment, a finger base, a first steering control mechanism, a first actuator, a second steering control mechanism, a universal joint and a second actuator is provided. The finger base is connected to one end of the finger segment, and the first steering control mechanism is disposed on the finger base. The first actuator is configured to provide a first moment to the first steering control mechanism. The first steering control mechanism is rotatably connected between the first actuator and the finger base, and the first moment is transferred to the finger segment via the first steering control mechanism and the finger base, so that the finger segment and the finger base have a degree of freedom in a first moving direction. The second steering control mechanism is disposed on the finger base. The universal joint is connected to the second steering control mechanism. The second actuator is configured to provide a second moment to the universal joint. The universal joint is rotatably connected between the second actuator and the second steering control mechanism, and the second moment is transferred to the finger segment via the universal joint and the second steering control, so that the finger segment has a degree of freedom in a second moving direction.

According to another embodiment, a robotic palm including a palm base and a plurality of finger devices disposed on the palm base is provided. The finger pitch adjustment and the curling movement of the finger devices are respectively controlled by the first actuator and the second actuator.

The above and other aspects of the disclosure will become understood with regard to the following detailed description of the preferred but non-limiting embodiment(s). The following description is made with reference to the accompanying drawings.

Figure 1A:
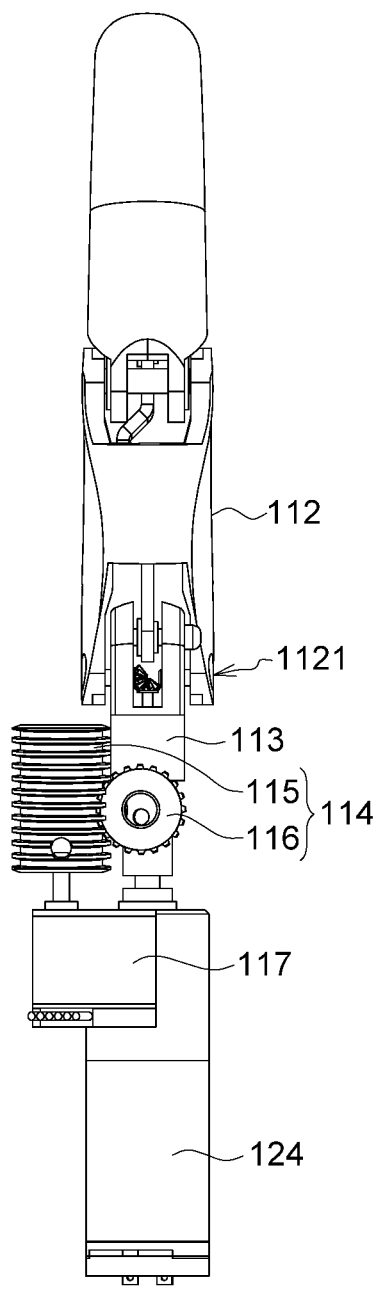
FIGS. 1A and 1B respectively are a front view and a side view of a finger device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are configured to indicate similar/identical elements. Directional terms such as above, under, left, right, front or back are configured in the following embodiments to indicate the directions of the accompanying drawings, not for limiting the present disclosure.

Figure 1B:
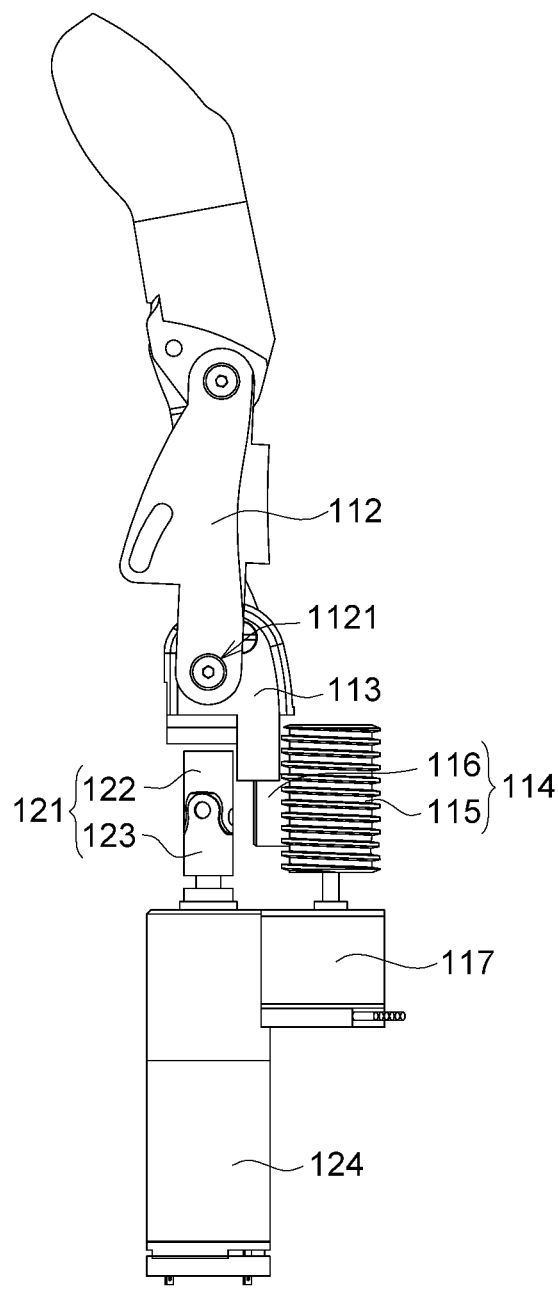
Figure 2A:
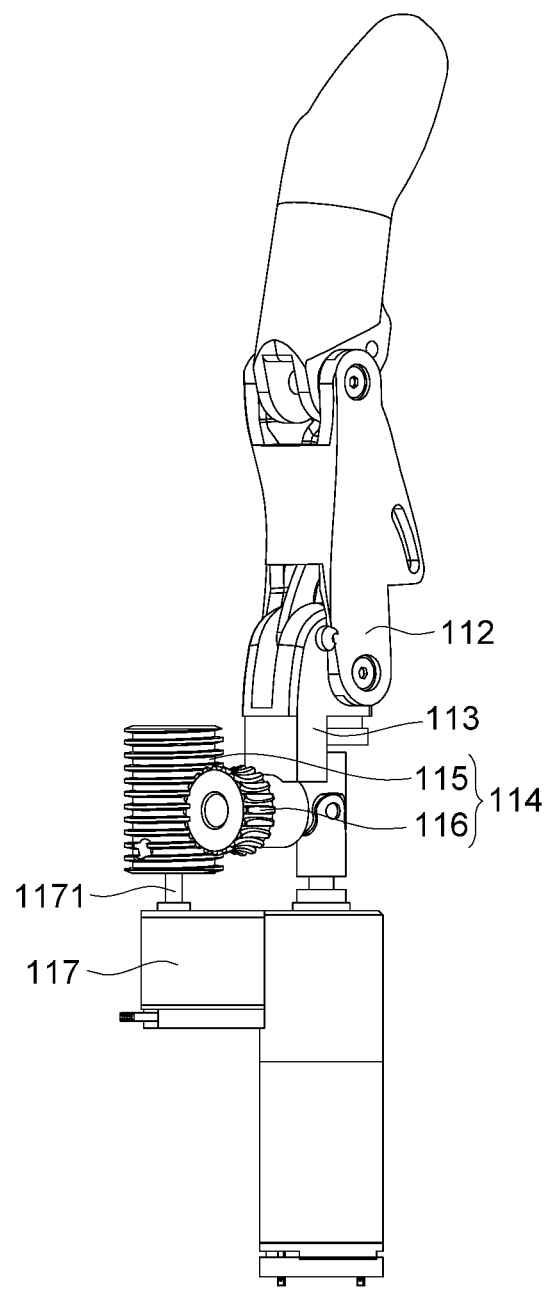
FIGS. 2A and 2B respectively are a front view and a swinging mode schematic diagram of a first steering control mechanism according to an embodiment of the present disclosure.
Figure 2B:
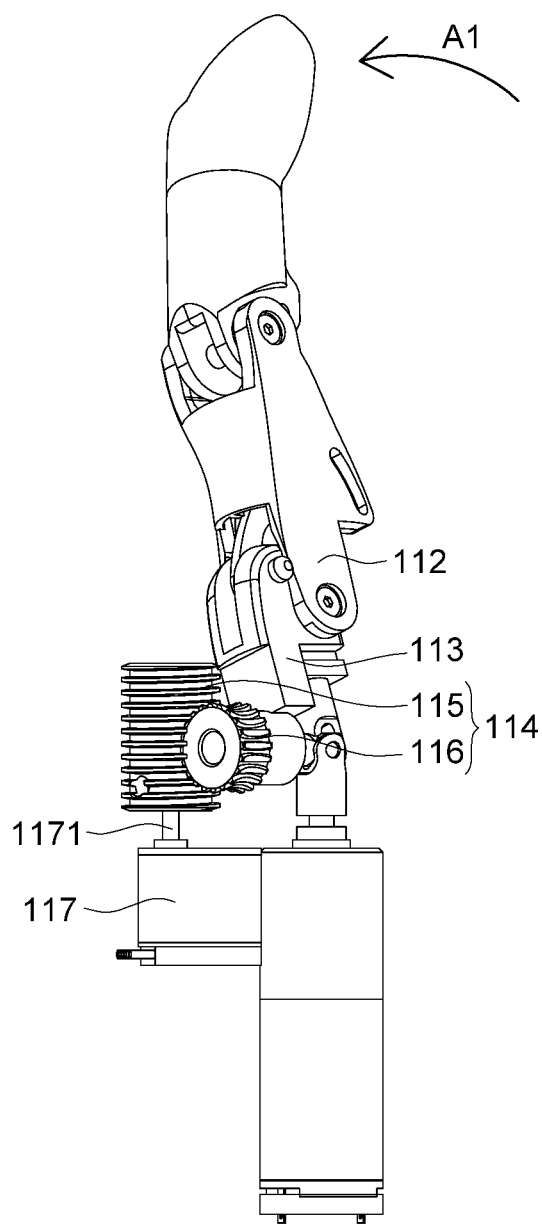
Figure 3A:
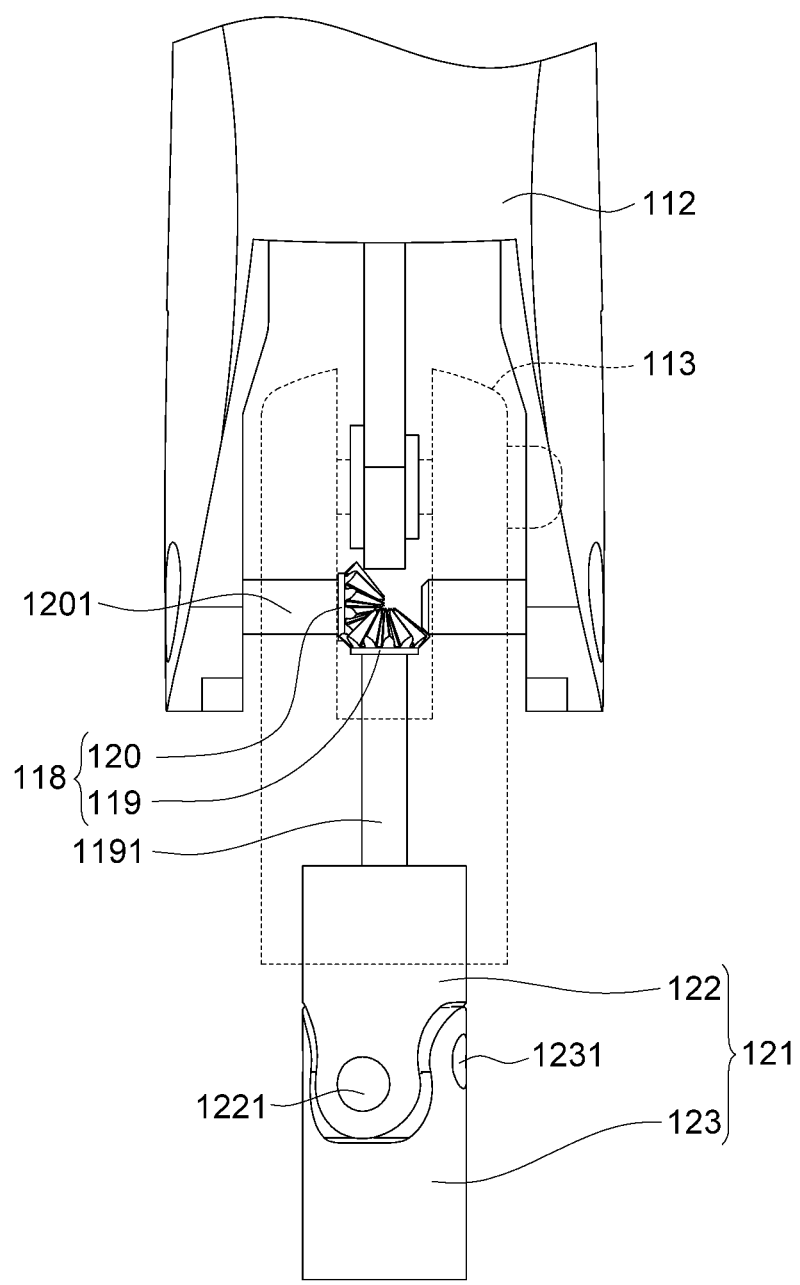
FIGS. 3A and 3B respectively are a front view and a curling mode schematic diagram of a second steering control mechanism according to an embodiment of the present disclosure.
Figure 3B:
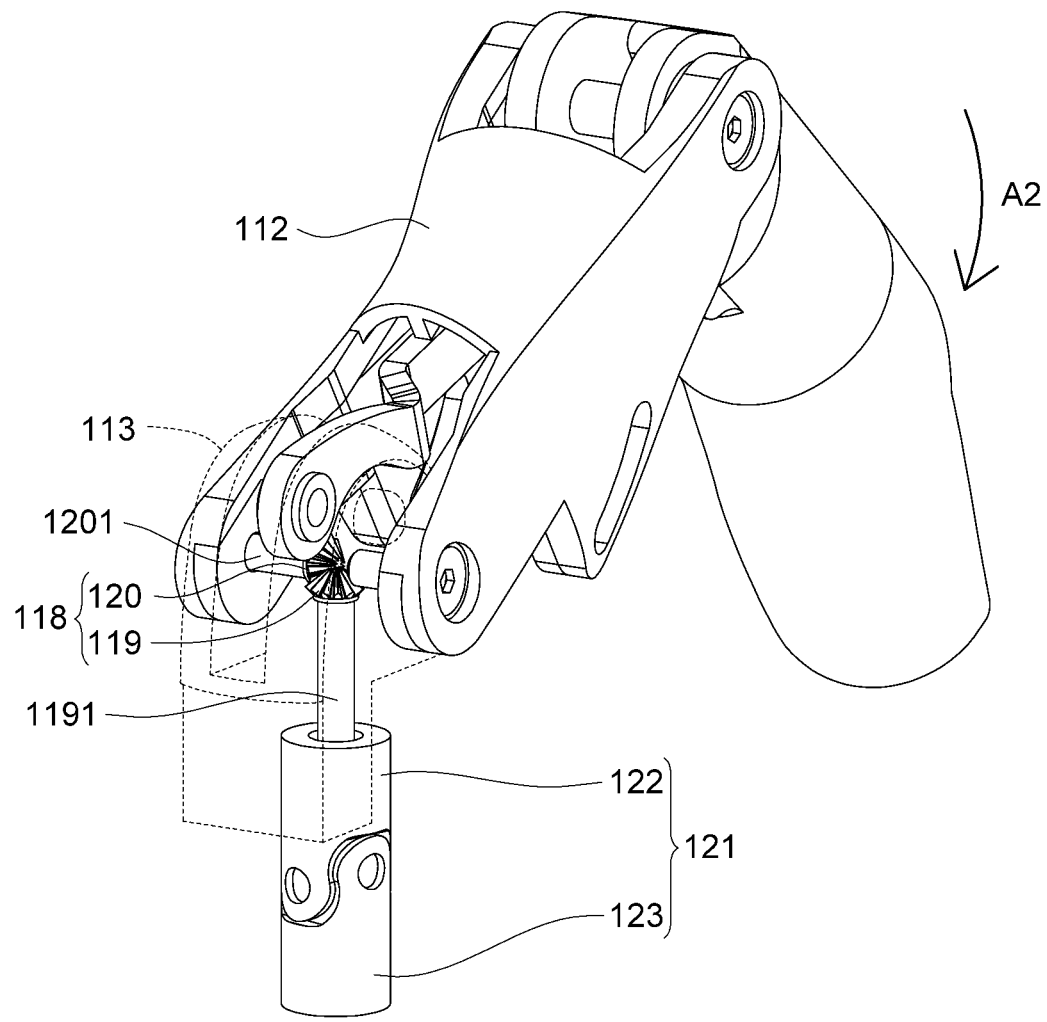
Figure 4A:
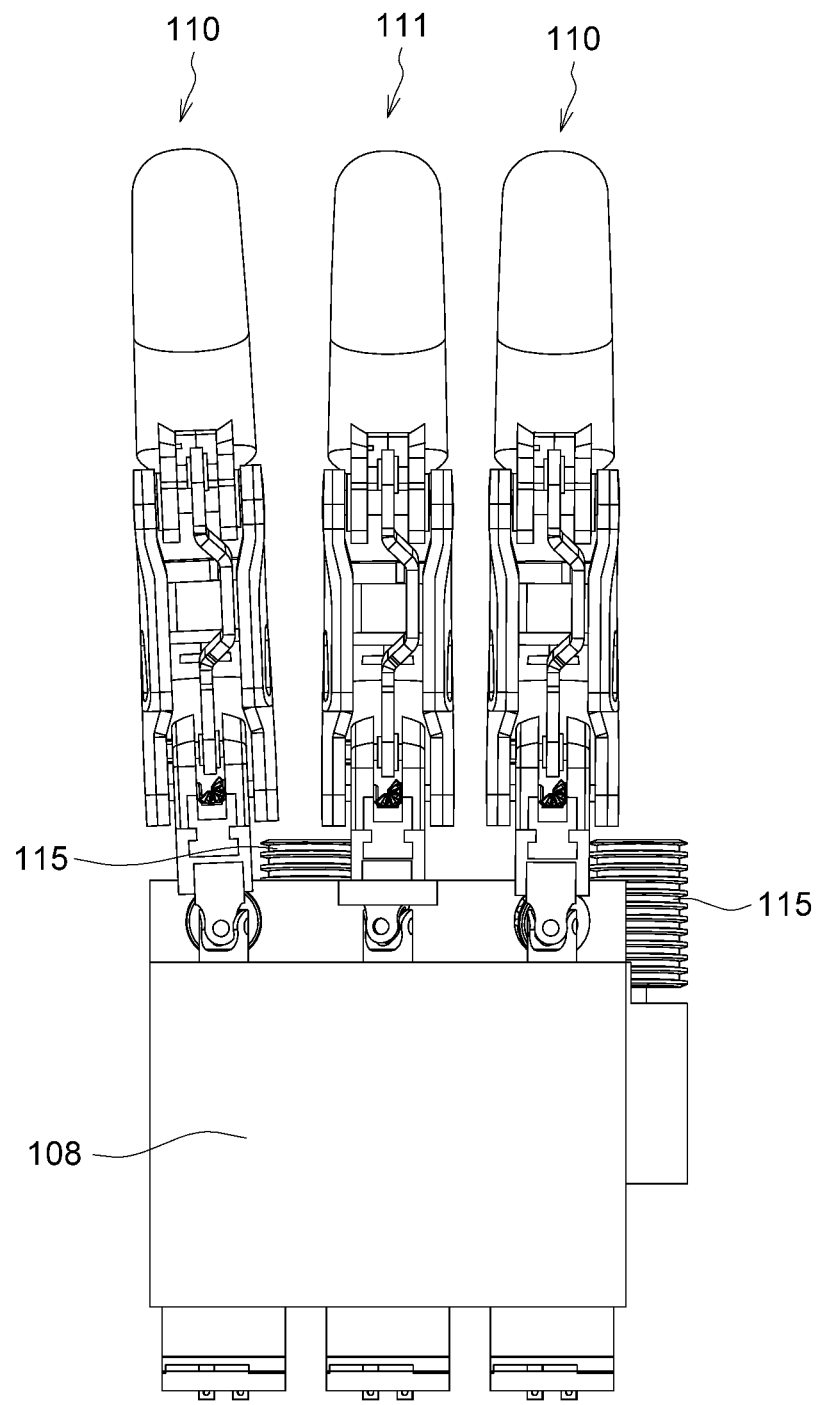
FIGS. 4A, 4B and 4C respectively are a front view, a finger pitch adjustment schematic diagram and a curling mode schematic diagram of a robotic palm according to an embodiment of the present disclosure.
Figure 4B:
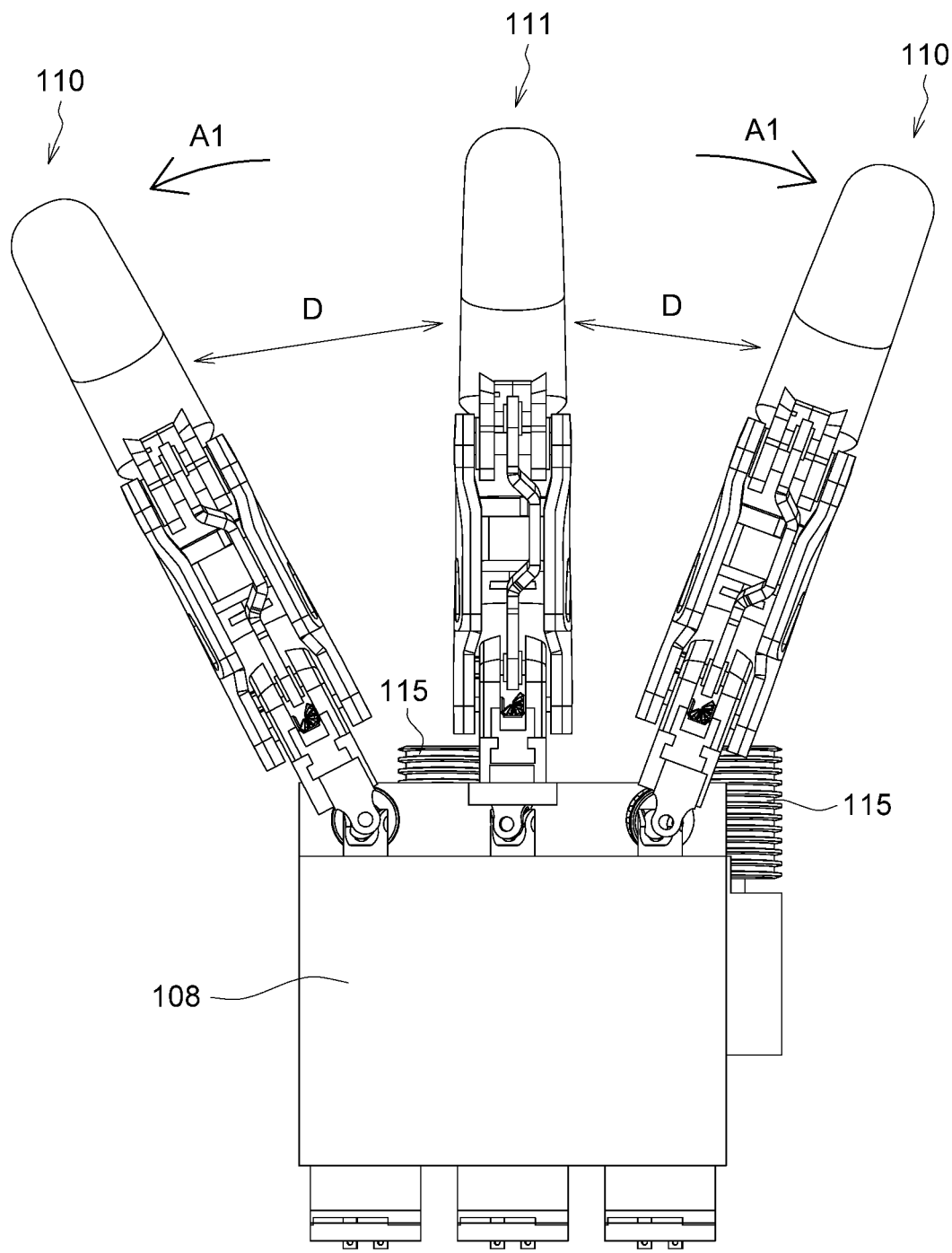
Figure 4C:
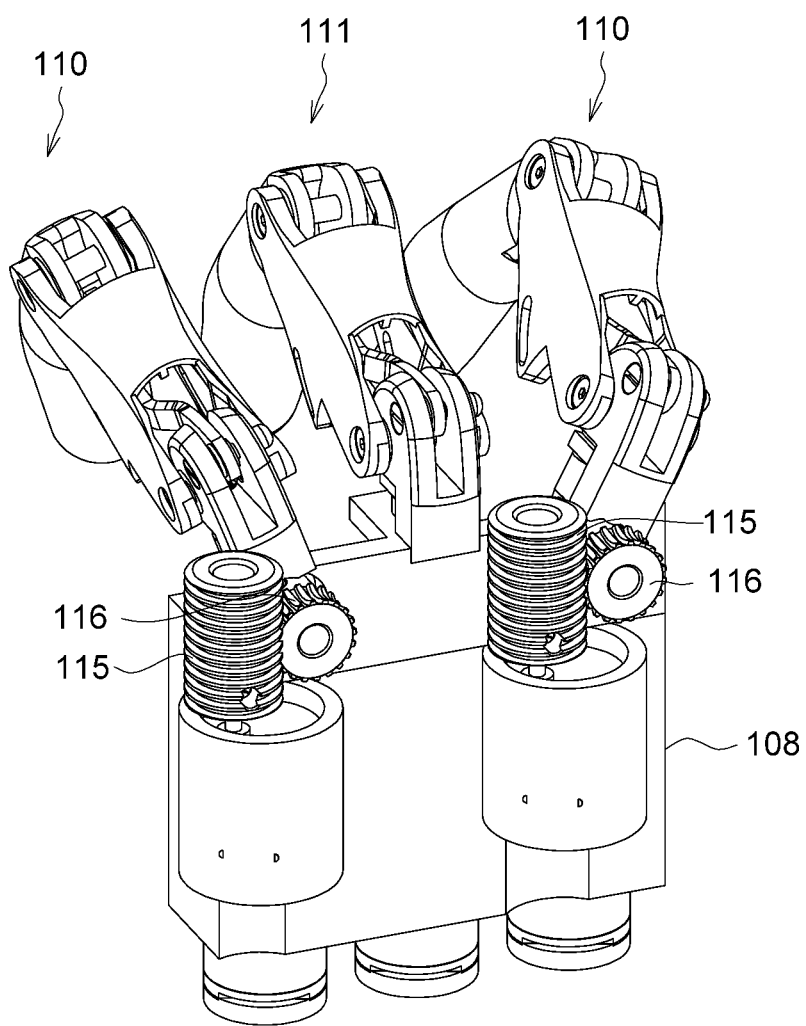

Referring to FIGS. 1A and 1B, are a front view and a side view of a finger device 110 according to an embodiment of the present disclosure are respectively shown. FIGS. 2A and 2B respectively are a front view and a swinging mode schematic diagram of a first steering control mechanism 114 according to an embodiment of the present disclosure. FIGS. 3A and 3B respectively are a front view and a curling mode schematic diagram of a second steering control mechanism 118 according to an embodiment of the present disclosure. FIGS. 4A, 4B and 4C respectively are a front view, a finger pitch adjustment schematic diagram and a curling mode schematic diagram of a robotic palm 100 according to an embodiment of the present disclosure.

The finger device 110 includes a finger segment 112, a finger base 113, a first steering control mechanism 114, a first actuator 117, a second steering control mechanism 118, a universal joint 121 and a second actuator 124. The side-to-side swinging mode (in other words, finger pitch adjustment) and the back-and-forth swinging mode (in other words, curling movement) of the finger device 110 are respectively controlled by the first actuator 117 and the second actuator 124. As indicated in FIGS. 4A, 4B and 4C, a plurality of finger devices 110 is disposed on the palm base 108 to form a robotic palm 100. The robotic palm 100 is configured to grasp an object by imitating human's finger actions, such as stretching, side-to-side swinging, pitch adjusting and curling. In the present embodiment, only 3 finger devices 110 are illustrated. However, the quantity of the finger device 110 is not limited. For example, the quantity of the finger device 110 may be 2 to 5, and like human fingers, the finger devices 110 can have different lengths. The finger segment 112 includes an upper finger segment, a middle finger segment and a lower finger segment, and two adjacent finger segments can be connected by a joint to generate a curling movement.

In an embodiment as indicated in FIGS. 1A and 1B, the finger base 113 is connected to one end 1121 (such as the joint portion) of the finger segment 112 and is located under the finger segment 112. The first steering control mechanism 114 is disposed on the finger base 113 and is adjacent to the end 1121. The first steering control mechanism 114 includes a steering worm 115 and a worm wheel 116 engaged with the steering worm 115. As indicated in FIGS. 2A and 2B, the steering worm 115 is disposed on the driving shaft 1171 of the first actuator 117, and the worm wheel 116 is disposed on the finger base 113. The first steering control mechanism 114 is configured to control the finger segment 112 and the finger base 113 to swing in a first moving direction A1. The finger segment 112 and the finger base 113 swing around the worm wheel 116 in the first moving direction A1.

In an embodiment, the first actuator 117 is configured to provide a first moment to the first steering control mechanism 114. The first steering control mechanism 114 is rotatably connected between the first actuator 117 and the finger base 113, and the first moment is transferred to the finger segment 112 via the first steering control mechanism 114 and the finger base 113, so that the finger segment 112 and the finger base 113 have a degree of freedom in the first moving direction A1. That is, the finger segment 112 and the finger base 113 are simultaneously driven by the first actuator 117 to swing side to side to adjust the finger pitch D between the finger devices 110 as indicated in FIG. 4B.

The first actuator 117 can be a step motor. The first steering control mechanism 114 is not limited to the steering worm 115 and the worm wheel 116 and can also be realized by other types of steering elements (such as helical gear set, bevel gear set or a combination of two mechanisms whose rotation shafts are orthogonal to each other). The finger device 110 can firstly calculate the number of rotations of the step motor per minute using an encoder, and then calculate the magnitude of the finger pitch D between the finger devices according to the relationship between the number of rotations of the step motor per minute and the distance or angle of the finger movement as indicated in FIG. 4B. Similarly, the finger device 110 can firstly calculate the number of rotations of the steering worm 115 and the worm wheel 116 per minute using an encoder, and then calculate the magnitude of the finger pitch D between the finger devices according to the relationship between the number of rotations of the steering worm 115 and the worm wheel 116 per minute and the distance or angle of the finger movement. With the features of stable speed of rotation and accurate positioning of the step motor, the finger device 110 can be adapted to perform conformal grasping of various objects.

As indicated in FIGS. 3A and 3B, the second steering control mechanism 118 is disposed on the finger base 113 to control the finger segment 112 to swing in a second moving direction A2. The second steering control mechanism 118 includes a first bevel gear 119 and a second bevel gear 120 engaged with the first bevel gear 119. The first bevel gear 119 is connected to the universal joint 121, and a first rod 1191 is disposed between the universal joint 121 and the first bevel gear 119. The second bevel gear 120 is connected to the finger segment 112, and a second rod 1201 is disposed between the finger segment 112 and the second bevel gear 120. The finger segment 112 swings around the second bevel gear 120 in the second moving direction A2 as indicated in FIG. 3B.

In an embodiment as indicated in FIGS. 1B, 3A and 3B, the second actuator 124 is configured to provide a second moment to the universal joint 121, wherein the universal joint 121 is rotatably connected between the second actuator 124 and the second steering control mechanism 118, and the second moment is transferred to the finger segment 112 via the universal joint 121 and the second steering control mechanism 118, so that the finger segment 112 has a degree of freedom in the second moving direction A2. That is, the finger segment 112 can be driven by the second actuator 124 to swing back and forth for the finger device 110 to perform a curling movement. Since the first rod 1191 of the first bevel gear 119 passes through the finger base 113 to be connected to the universal joint 121 and so does the second rod 1201 of the second bevel gear 120 pass through the finger base 113 to be connected to the finger segment 112, the finger base 113 will not swing around the second bevel gear 120 in the second moving direction A2. That is, the finger base 113 only swings in the first moving direction A1 but not in the second moving direction A2.

The second actuator 124 can be a step motor. The second steering control mechanism 118 is not limited to the bevel gear set and can also be realized by other types of steering elements (such as the steering worm 115 and the worm wheel 116). In another embodiment, the steering worm 115 and the worm wheel 116 can be configured in the second steering control mechanism 118, and the first bevel gear 119 and the second bevel gear 120 can be configured in the first steering control mechanism 114. Alternatively, the first steering control mechanism 114 and the second steering control mechanism 118 both can use the steering worm 115 and the worm wheel 116. Alternatively, the first steering control mechanism 114 and the second steering control mechanism 118 both can use the first bevel gear 119 and the second bevel gear 120. The present disclosure does not have specific restrictions regarding the above arrangements, and any combination of mechanisms will do as long as the rotation shafts of the two mechanisms are orthogonal to each other. Furthermore, the finger device 110 can firstly calculate the number of rotations of the first bevel gear 119 and the second bevel gear 120 per minute using an encoder, and then calculate the curling angle of each finger according to the relationship between the number of rotations of the first bevel gear 119 and the second bevel gear 120 per minute and the distance or angle of the finger movement.

Refer to FIGS. 3A and 3B. The universal joint 121 can be a coupler with a cross joint (not illustrated). One connecting rod 1221 of the cross joint is connected to the first moving member 122, and the other connecting rod 1231 of the cross joint is connected to the second moving member 123. The first moving member 122 is connected to the first bevel gear 119 via the first rod 1191, and the second moving member 123 is connected to the driving shaft of the second actuator 124 (as indicated in FIG. 1B). When the second moving member 123 is driven to rotate by the second actuator 124, the first moving member 122 rotates along with the second moving member 123. The universal joint 121 enables the finger segment 112 and the finger base 113 to swing in the first moving direction A1 and simultaneously enables the finger segment 112 to swing in the second moving direction A2. Therefore, the finger segment 112 can swing both in the first moving direction A1 and the second moving direction A2 or can swing only in the first moving direction A1 or only in the second moving direction A2. The first moving direction A1 and the second moving direction A2 are orthogonal, for example.

When the finger segment 112 swings both in the first moving direction A1 and the second moving direction A2, the motion track of the finger segment 112 is conical (the finger segment swings both side to side and back and forth). When the finger segment 112 swings only in the first moving direction A1 or the second moving direction A2, the motion track of the finger segment 112 is fan-shaped (the finger segment swings side to side or back and forth). Therefore, each finger segment 112 can move independently according to actual needs, and the moving directions of the finger segments 112 do not interfere with each other. Furthermore, the finger device 110 can obtain more degrees of freedom through the curling movement of the joints between the finger segments 112.

Refer to the robotic palm 100 of FIGS. 4A, 4B and 4C. The finger device 111 disposed between two finger devices 110 only performs stretching movement and curling movement, and therefore only one actuator is provided. However, the two finger devices 110 disposed on the two sides of the finger device 111 can perform finger pitch D adjustment, and therefore two actuators are respectively provided. When the finger devices 110 and 111 move simultaneously, the actuators of the finger devices 110 and 111 can be independently or collectively controlled by a palm controller (not illustrated). Moreover, the finger segments 112 of the finger devices 110 and 111 can work together to perform actions such as stretching, opening, closing, curling and grasping to imitate human's finger actions such as finger curling and/or finger pitch adjustment to increase the flexibility of the robotic palm 100.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A finger device, comprising:
a finger segment;
a finger base connected to one end of the finger segment;
a first steering control mechanism disposed on the finger base;
a first actuator configured to provide a first moment to the first steering control mechanism, wherein the first steering control mechanism is rotatably connected between the first actuator and the finger base, and the first moment is transferred to the finger segment via the first steering control mechanism and the finger base, so that the finger segment and the finger base have a degree of freedom in a first moving direction to perform a swing movement;
a second steering control mechanism disposed on the finger base;
a universal joint connected to the second steering control mechanism; and
only one second actuator configured to provide a second moment to the universal joint, wherein the universal joint is rotatably connected between the second actuator and the second steering control mechanism, and the second moment is transferred to the finger segment via the universal joint and the second steering control mechanism, so that the finger segment has a degree of freedom in a second moving direction to perform a curling movement.

2. The finger device according to claim 1, wherein the first steering control mechanism comprises a steering worm and a worm wheel engaged with the steering worm, the steering worm is disposed on a driving shaft of the first actuator, and the worm wheel is disposed on the finger base.

3. The finger device according to claim 2, wherein the finger segment and the finger base swing around the worm wheel in the first moving direction.

4. The finger device according to claim 1, wherein the first steering control mechanism comprises a first bevel gear and a second bevel gear engaged with the first bevel gear, the first bevel gear is connected to the first actuator, and the second bevel gear is connected to the finger base.

5. The finger device according to claim 4, wherein the finger segment and the finger base swing around the second bevel gear in the first moving direction.

6. The finger device according to claim 1, wherein the second steering control mechanism comprises a first bevel gear and a second bevel gear engaged with the first bevel gear, the first bevel gear is connected to the universal joint, and the second bevel gear is connected to the finger segment.

7. The finger device according to claim 6, wherein the finger segment swings around the second bevel gear in the second moving direction.

8. The finger device according to claim 1, wherein the second steering control mechanism comprises a steering worm and a worm wheel engaged with the steering worm, the steering worm is disposed on a driving shaft of the second actuator, and the worm wheel is disposed on the finger segment.

9. The finger device according to claim 8, wherein the finger segment swings around the worm wheel in the second moving direction.

10. A robotic palm, comprising:
a palm base; and
a plurality of finger devices according to claim 1, wherein the finger devices are disposed on the palm base, and a finger pitch adjustment and a curling movement of the finger devices are respectively controlled by the first actuator and the second actuator.

11. The robotic palm according to claim 10, wherein the first moving direction is perpendicular to the second moving direction.

* * * * *